Dec. 9, 1947.  F. T. COURT  2,432,385
WHEEL WITH AXIALLY ADJUSTABLE RIM
Filed March 9, 1946  2 Sheets-Sheet 1

INVENTOR.
FRANK T. COURT, DECEASED
VIRGINIA F. COURT, EXECUTRIX
BY
ATTORNEYS.

Dec. 9, 1947.        F. T. COURT        2,432,385
WHEEL WITH AXIALLY ADJUSTABLE RIM
Filed March 9, 1946        2 Sheets-Sheet 2

*INVENTOR.*
FRANK T. COURT, DECEASED
VIRGINIA F. COURT, EXECUTRIX
BY

Patented Dec. 9, 1947

2,432,385

UNITED STATES PATENT OFFICE 2,432,385

WHEEL WITH AXIALLY ADJUSTABLE RIM

Frank T. Court, deceased, late of Moline, Ill., by Virginia F. Court, executrix, Moline, Ill., assignor to Deere & Company, Moline, Ill., a corporation of Illinois Application March 9, 1946, Serial No. 653,308

10 Claims. (Cl. 301—9)

The present invention relates generally to adjustable wheels and more particularly to the type having an axially adjustable rim, the usual purpose of which is to provide for adjusting the lateral spacing between the two wheel treads on opposite sides of a vehicle, such as a tractor, for example. The principal object of this invention has to do with the provision of a simplified means for supporting and adjusting the rim on the wheel body, which is less expensive to manufacture and simpler to adjust, but which is also stronger and more durable in operation than those heretofore known in the art.

A further object relates to the provision of an adjustable wheel which can be adjusted axially by power supplied by the vehicle.

These and other objects and advantages of the present invention will be apparent to those skilled in the art after a consideration of the following description, in which reference is had to the drawings appended hereto, in which Figure 1 is a side elevational view of a farm tractor embodying the principles of the present invention;

Figure 1:
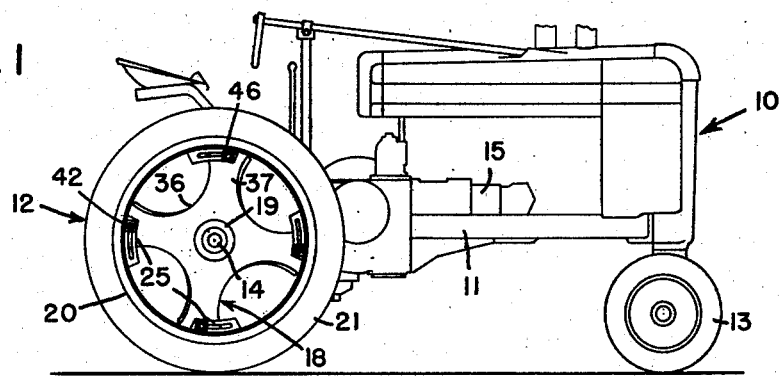
Figure 3:
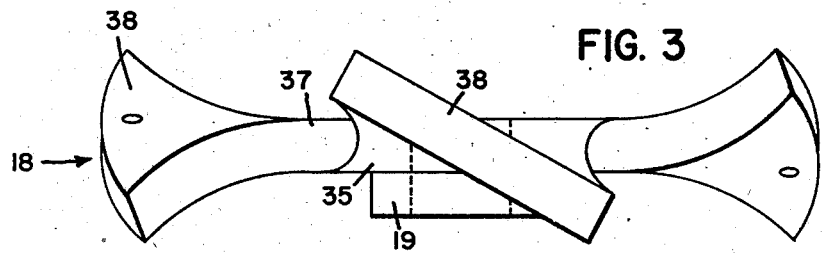
Figure 3 is a top plan view of the wheel body.
Figure 2:
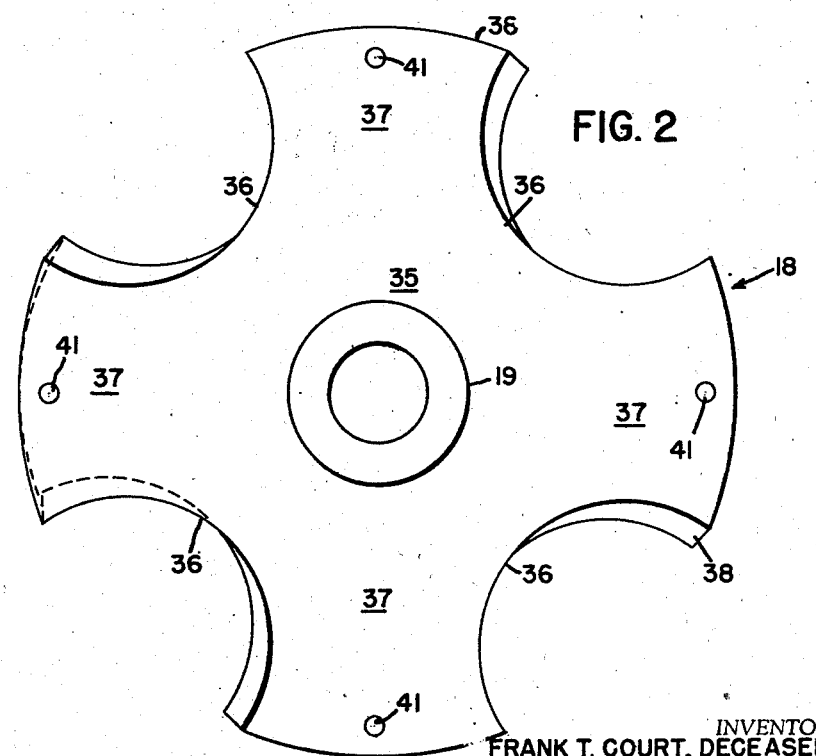
Figure 2 is a side elevational view, drawn to an enlarged scale, of the wheel body.
Figure 4:
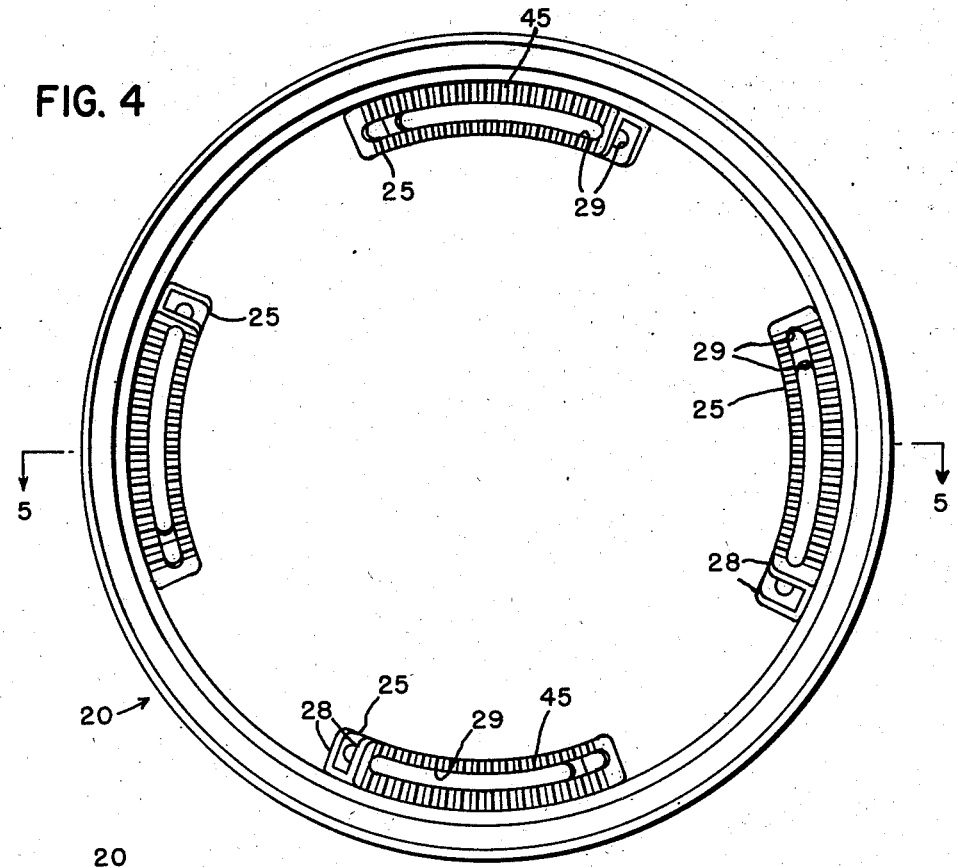
Figure 4 is a side elevational view of the wheel rim.
Figure 5:
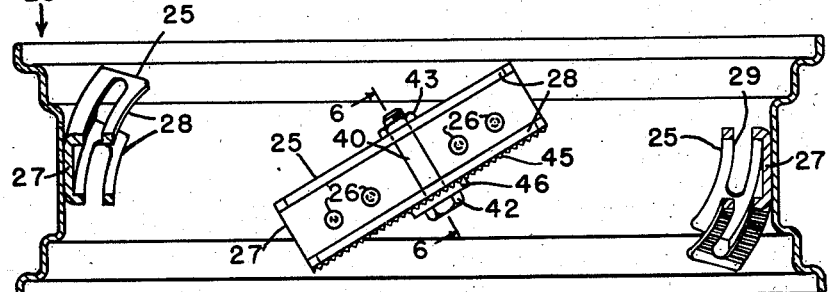
Figure 5 is a sectional plan view taken along a line 5—5 in Figure 4.
Figure 6:
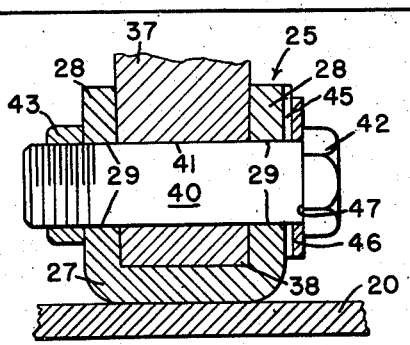
Figure 6 is a sectional view, drawn to an enlarged scale, as viewed along a line 6—6 in Figure 5.

Referring now to the drawings, the tractor is indicated in its entirety by reference numeral 10 and comprises a body or frame 11 carried on a pair of laterally spaced rear traction wheels 12 and front dirigible wheels 13. Each of the traction wheels 12 is mounted on a laterally extending drive axle 14, which is connected to the tractor engine 15 by suitable power transmitting mechanism well known to those skilled in the art.

Each of the traction wheels 12 comprises a wheel body 18 having a central hub member 19 secured to the tractor axle 14, and a rim 20 mounted on the wheel body 18 by means which will be described, the rim 20 preferably being of the type adapted to receive a pneumatic tire 21.

The inner surface of the rim 20 is provided with mounting means in the form of a plurality of circumferentially spaced channel shaped elements 25, each of which is rigidly secured by rivets 26 to the inner surface of the rim 20, the elements being positioned with the open side of the channel facing inwardly. Each of the elements 25 is disposed at an acute angle to a plane perpendicular to the axis of rotation and is curved to conform with the inner surface of the rim 20, thereby defining a short section of a helical groove.

Preferably, there are four channel elements 25, each comprising a curved back portion 27 secured by the rivets 26 to the inner surface of the rim 20, and a pair of inwardly projecting side walls 28, each of which is provided with a longitudinally extending slot 29. Each of the slots 29 is curved about the axis of the rim at equal distances therefrom.

The wheel body 18 comprises a unitary disk 35 having four cutaway portions 36 spaced circumferentially to provide therebetween four spokes 37. Each of the spokes 37 is a segmental portion of the disk 35 and is twisted to position the outer edge 38 in a helical shape, at an acute angle to a plane perpendicular to the axis of the wheel body 18. The four outer edges 38 of the spokes 37 serve as flanges which are adapted to be slidably received into the open ends of the grooves defined by the channel shaped elements 25. Thus, in the manner of threads, each of the associated pairs of channel members 25 and flanges 38 cooperates in such a manner that relative rotation between the rim 20 and wheel body 18 causes an axial shifting movement relative thereto. Each of the spokes 37 is rigidly secured in adjusted position to its associated channel member 25, by means of a clamping bolt 40, which can be inserted through the slots 29 in opposite side walls 28, and through an aligned aperture 41 in the associated spoke 37, preferably disposed on the center line of the latter and in alignment with the slots 29. Each of the bolts 40 is provided with a head 42 on one end and a nut 43 threaded on the opposite end, which can be tightened against the outer sides of the walls 28 to clamp the latter firmly against opposite faces of the spoke 37.

In order to further insure that the rim and wheel body are secured against relative rotation, one of the outer sides of each of the channel members 25 is roughened, as indicated at 45, preferably by transverse corrugations or serrations extending generally radially, although this may be accomplished by knurling the surface, if desired. A washer 46 is provided under the heads 42 of the bolts 40, the inner face 47 of the washer 46 being correspondingly roughened, such as by serrations or corrugations to interfit with the corrugations 45 in the outer face of the channel wall 28. Thus, when the nut 43 is tightened, the washer 46, and the two side walls 28 of the channel member 25 are clamped tightly against the sides of the spokes 37.

In operation, when it is desired to change the lateral spacing between the rear traction wheels, the nuts 43 on each of the bolts 40 of one of the wheels are loosened and the bolts 40 are shifted axially to disengage the washers 46 from the serrations 45 and the tractor is driven forwardly or rearwardly to cause the wheel rim 20 to shift angularly about the axis of the axle 14 relative to the wheel body 18. It is also effective to apply the brake on the wheel that is being adjusted and drive the tractor through the other traction wheel either forwardly or rearwardly to obtain the desired relative rotation between the rim and wheel body. If the brake on the wheel being adjusted is applied while the tractor is moving forwardly at an appreciable speed, a strong force is applied to the rim tending to shift it relative to the wheel body, which tends to loosen the wheel relative to the rim when the channel members 25 are clogged with mud.

What is claimed is:

1. In combination, a wheel rim, means on the inner side of said rim defining a groove disposed at an acute angle to the plane of revolution of said rim, a wheel body having peripherally extending means disposed at an acute angle to the plane of revolution of said wheel and adapted to slidably engage said groove, whereby relative angular movement between said wheel body and said rim effects a relative axial shifting movement therebetween, said groove defining means and said peripherally extending means having transverse apertures therein adapted to register in various positions of relative adjustment of said body and rim, and securing means insertable through said registering apertures for fixably connecting said body and said rim.

2. The combination set forth in claim 1, including the further provision that one of said apertures is elongated in a peripheral direction to form a slot through which said securing means is slidable during relative angular movement of said body and rim.

3. In combination, a wheel rim member, a wheel body member, and means between said members for mounting said rim member on said body member providing for axial adjustment relative thereto comprising peripherally extending means defining a channel fixed on one of said members and a flange fixed on the other of said members and slidable in said channel, said channel and flange defining means being disposed at an acute angle to a plane perpendicular to the axis of revolution of said members, whereby relative angular movement of said members about said axis effects a relative axial shifting movement of said members, said channel means being provided with arcuate slots in the sides thereof, curved about the axis of revolution, and said flange means having an aperture adapted to register with said slots in any adjusted position of said members, and securing means insertable through said slots and aperture to fix said members together in adjusted position.

4. The combination set forth in claim 3, including the further provision that said channel defining means comprise spaced walls deflectable toward and away from each other, and said securing means comprises a clamping bolt adapted to draw said walls into clamping engagement with opposite faces of said flange means.

5. The combination set forth in claim 3, including the further provision that said channel defining means comprise spaced walls, the outer face of one wall having a roughened surface, and said securing means includes a roughened shoulder portion engageable with said surface to resist relative movement therebetween from said adjusted position.

6. The combination set forth in claim 3, including the further provision that said channel defining means comprise spaced walls deflectable toward and away from each other, the outer face of one wall having a roughened surface, and said securing means comprises a clamping bolt adapted to draw said walls into clamping engagement with opposite faces of said flange means, said securing means includes a roughened shoulder portion engageable with said surface to resist relative movement therebetween from said adjusted position.

7. In combination, a wheel rim member, a wheel body member, and means between said members for mounting said rim member on said body member providing for axial adjustment relative thereto comprising a plurality of channel shaped elements rigidly secured to the inside of said rim member with the open end of each channel facing inwardly, each element being disposed at acute angles to a plane perpendicular to the axis of rotation, a wheel body having outwardly extending flange portions rigid thereon and disposed at said acute angles to said plane perpendicular to the axis and adapted to slidably fit said channels, respectively, whereby angular movement of said rim member relative to said body member shifts said rim member axially relative to said body member, and detachable means for clamping said channels against opposite sides of said flanges to prevent relative movement therebetween.

8. The combination set forth in claim 7, including the further provision that said wheel body comprises a disk having cut-out portions defining segmental spokes, each spoke being twisted to dispose the periphery at said acute angle relative to a plane perpendicular to said axis, and said peripheries serving as said flanges to be received in said channel elements.

9. In an adjustable wheel structure of the class described, a rim and a plurality of channel shaped elements rigidly secured to the inside of said rim with the open end of each channel facing inwardly, each element being inclined axially relative to the plane of rotation, and the sides of said channel having arcuate slots extending longitudinally thereof, said slots being aligned to receive a transverse clamping bolt therethrough.

10. The device described in claim 9, including the further provision that the outer surface of one side of each channel is roughened to coact with a clamping means and that said sides of said channels are sufficiently resilient to provide for clamping them together on opposite sides of a support.

VIRGINIA F. COURT,
*Executrix of the Estate of Frank T. Court, Deceased.*

REFERENCES CITED

The following references are of record in the file of this patent:

UNITED STATES PATENTS

| Number | Name | Date |
| --- | --- | --- |
| 1,385,396 | Rayburn | July 26, 1921 |
| 1,730,490 | Winchester | Oct. 8, 1929 |
| 2,203,965 | Nampa | June 11, 1940 |